United States Patent
Childs et al.

(10) Patent No.: US 7,272,573 B2
(45) Date of Patent: Sep. 18, 2007

(54) INTERNET STRATEGIC BRAND WEIGHTING FACTOR

(75) Inventors: Jane Childs, New South Wales (AU); Moon Ju Kim, Wappingers Falls, NY (US); Susan Burlingame Levangia, Kingston, NY (US); Paul Nicholas Martynenko, Hampton (GB); Juan Leon-Rodriguez, Pleasant Valley, NY (US); Lamana Rogers, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 1018 days.

(21) Appl. No.: 10/054,301

(22) Filed: Nov. 13, 2001

(65) Prior Publication Data

US 2003/0093331 A1    May 15, 2003

(51) Int. Cl.
    *G06Q 30/00*    (2006.01)
(52) U.S. Cl. .............................. 705/26; 705/10; 705/14; 705/27
(58) Field of Classification Search ................... 705/26, 705/14, 27, 10
    See application file for complete search history.

(56) References Cited

U.S. PATENT DOCUMENTS

| | | | | |
|---|---|---|---|---|
| 4,498,079 | A | 2/1985 | Ghosh et al. ................ | 340/725 |
| 4,996,642 | A * | 2/1991 | Hey ............................ | 705/27 |
| 5,765,178 | A | 6/1998 | Tanaka ........................ | 707/526 |
| 5,794,210 | A | 8/1998 | Goldhaber et al. ........... | 705/14 |
| 5,848,406 | A | 12/1998 | Mani et al. .................... | 707/2 |
| 5,897,622 | A | 4/1999 | Blinn et al. ................... | 705/26 |
| 6,014,638 | A | 1/2000 | Burge et al. .................. | 705/27 |
| 6,148,289 | A | 11/2000 | Virdy ............................ | 705/1 |
| 6,266,649 | B1 * | 7/2001 | Linden et al. ................ | 705/26 |
| 6,489,968 | B1 * | 12/2002 | Ortega et al. ............... | 715/713 |
| 2002/0049701 | A1 * | 4/2002 | Nabe et al. .................... | 707/1 |

FOREIGN PATENT DOCUMENTS

WO    WO 01/03036    *    1/2001

OTHER PUBLICATIONS

Sergey Brain & Lawrence Page, "The Anatomy of a Large-Scale Hypertefual Web Search Engine" Computer Science Dept. Stanford University—pp. 1 to 15.
IBM Research Disclosure, p. 183, Jan. 2000 "Search Result Advertisements".

* cited by examiner

*Primary Examiner*—F. Zeender
*Assistant Examiner*—M. Thein
(74) *Attorney, Agent, or Firm*—Norman Gundel

(57) ABSTRACT

A method, software and apparatus are provided which enable a merchant to promote products and services in a deterministic manner. When a shopper enters a set of key words in an entry in an on-screen form for a web server to obtain a list of items (products and/or services) of interest to the shopper, the documents describing the items are prioritized based on the web sites owner's organizational strategic decisions by the merchant providing a weighting factor for the products and services. The weighting factor is combined with existing ranking mechanisms to the documents to increase the probability that certain items come to the top when the search results are presented to the shopper. These items could be used to ensure shoppers do not overlook special offers or to reduce overstocks by promoting products with a large inventory. The weighting factor is configured so as to not decrease the shoppers confidence in the ranking process.

8 Claims, 5 Drawing Sheets

INTERNET STRATEGIC BRAND WEIGHTING FACTOR

FIELD OF THE INVENTION

The present invention relates to a system for customizing on-line service content presentations by an on-line product seller. More particularly, the present invention relates to brand weighting by the seller to offer product and services in a deterministic manner.

BACKGROUND OF THE INVENTION

Typically, shoppers browse selections offered by participating on-line merchants by specifying criteria regarding the type of product they would like to find such as the manufacturers product features or price tags. Based on product attributes entered by the shopper into a browser, such as Netscape, the browser interrogates the databases of on-line merchants for the product attributes entered by the shopper into the system. The system ranks the products turned up by the database search based on ranking algorithms which take into consideration various ranking factors, such as the number of occurrences of terms in documents, the proximity of terms to one another within the documents, etc., and provides the products to the seller listed in order of their rank.

While this method helps shoppers locate products and services they desire, it limits the amount of control shoppers have over the shopping environment and experience. Generally speaking, for the same set of database interrogations, each of the shoppers would receive the same set of results and in the same order. To tailor the presentations to the shopper, a number of systems analyze the on-line behavior of the shopper to vary characteristics and elements of the displays presented to the shoppers to the individual shopper's preferences and needs. The shopper's characteristics that may be used to tailor the presentations would include previous data on stores visited, time of the visit, length of the visit, merchandise viewed, purchases made, frequency of visits, etc.

While a number of such systems have been proposed to tailor the materials provided to the user based on user preferences, there is a dearth of ways for the seller to promote products it wishes to bring particular attention to. One method known is the use of advertising banners on third party web sites that try to induce a shopper to visit a specified web site of the banner provider. This usually requires a small fee to be paid by the banner to the third party site owner of the banner display site. In addition as more and more use is made of such banners, users tend to ignore them when looking at a web page. The user's eyes focus on the central part of the screen and avoid viewing the periphery of the screen where the banners are displayed.

Therefore, it is an object of the present invention to provide a new way for an on-line merchant to emphasize products he wishes to bring to the attention of shoppers.

Another object of the invention is to provide a consistent marketing strategy with respect to products they wish to promote.

It is another object of the invention to provide a way for merchants to promote certain products and services in a deterministic manner.

BRIEF DESCRIPTION OF THE INVENTION

In accordance with the present invention, a method, software and apparatus are provided which enable a merchant to promote products and services in a deterministic manner. When a shopper enters a set of key words in an entry field in an on-screen form for a web server to obtain a list of items (products and/or services) of interest to the shopper, the documents describing the items are prioritized based on the web sites owner's organizational strategic decisions by the merchant providing a weighting factor for the products and services. The weighting factor is combined with existing ranking mechanisms to the documents to increase the probability that certain items come to the top when the search results are presented to the shopper. These pages could be used to ensure shoppers do not overlook special offers or to reduce overstocks by promoting products with a large inventory. The weighting factor is configured so as to not decrease the shoppers confidence in the ranking process.

DETAILED DESCRIPTION OF THE INVENTION

Figure 1:
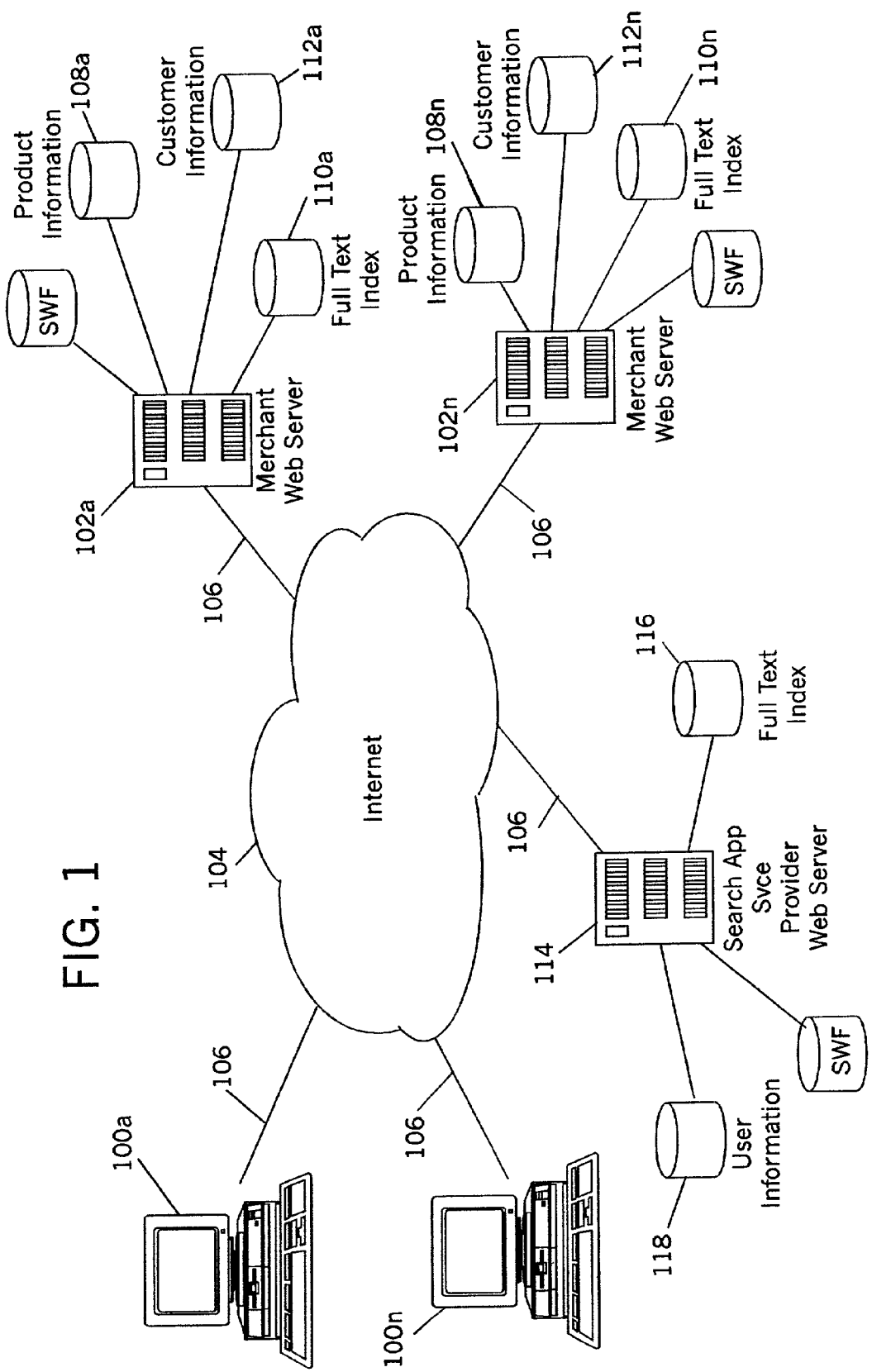
FIG. 1 is a system organization for an on-line service in a wide area network.

Referring now to FIG. 1, communication between a plurality of shoppers computers 100a to n and a plurality of merchants servers 102a to n is accomplished via an on-line service through a wide area network such as the Internet 104 that includes network node computers. The network node servers manage network traffic such as the communications between any given shopper's computer and merchant's server.

The shoppers' computers 100 are equipped with communications software, including a WWW browser such as the Netscape browser of Netscape Communications Corporation, that allows a shopper to connect and use on-line shopping services via the Internet. The software on a shopper's computer 100 manages the display of information received from the merchants to the shopper and communicates the shopper's actions back to the appropriate merchant servers 102 so that additional display information may be presented to the shopper or the shoppers selections acted on. The connections 106 to the network nodes of the Internet may be established via a modem or other means such as a cable connection.

Information regarding the merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, there are the servers 114 of search engine service providers web pages, such as Google of Google Inc., which maintain full text indexes 116 of the products of the individual merchants 102 to 102n obtained by interrogating the product information databases 108 of the individual merchants.

In addition to the information about itself and its product, the merchants and the search application service providers each may maintain a database of information about shoppers and their buying habits to customize on-line shopping for the shopper. Operations to accomplish a customized electronic shopping environment for the shopper include accumulating data regarding the shopper's preferences. Raw data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g., age, address, hobbies) regarding the shopper as provided by the shopper when subscribing to the service. The data accumulated on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

Figure 2:
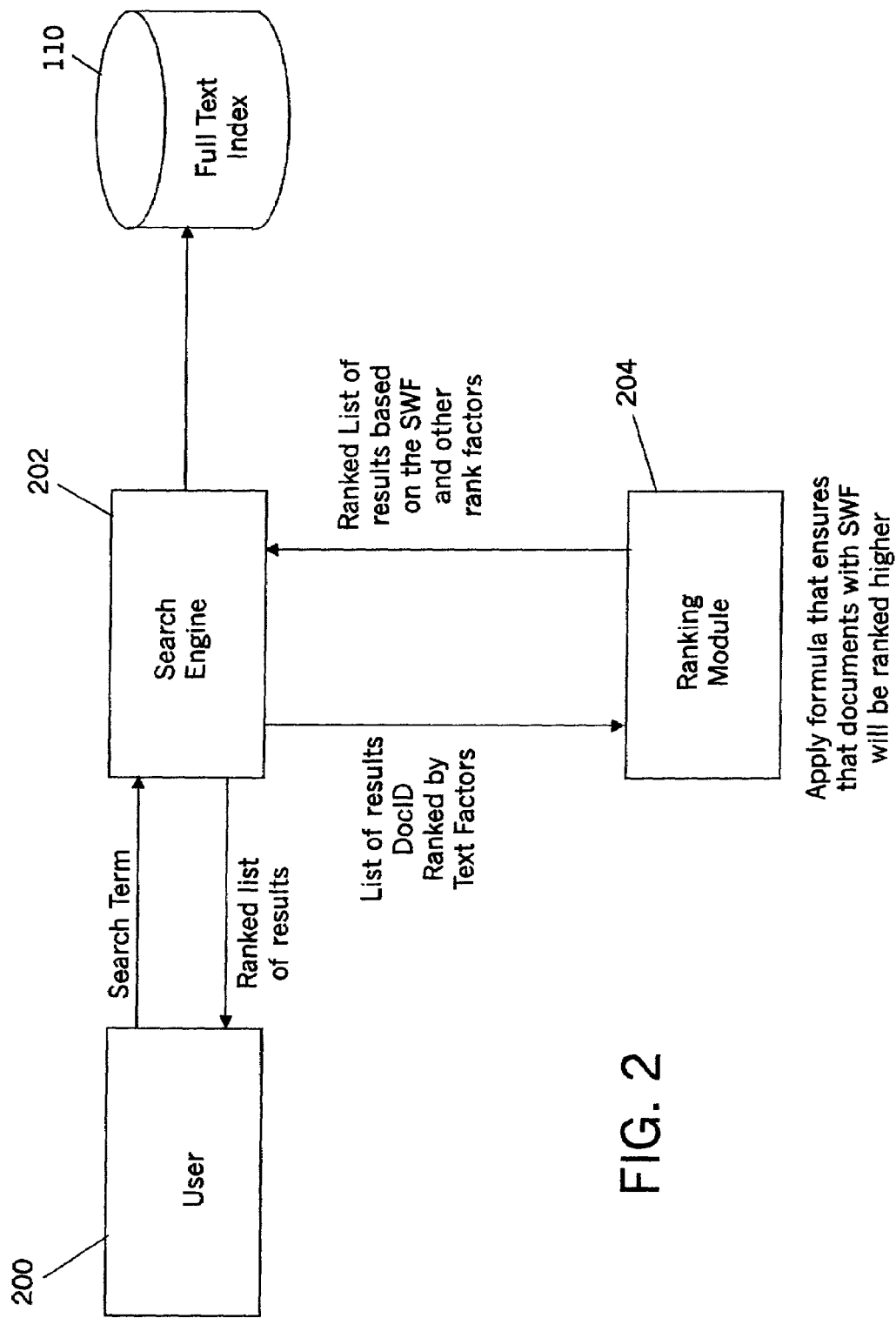
FIG. 2 is a flow chart of a system for providing ranking in accordance with the present invention.

As shown in FIG. 2, when the search characteristics in the form for key words are entered by the shopper 200 into the space provided on the default or home page of his/her browser, the search engine 202 of the merchant web server 102 does a search of the accessed full text index database 110 or 118 using the key words and gets a list of documents describing those products and services that contain matches to the key words. This list of documents contain basic text ranking Tf (including the number of hits, their location, etc. which are used to order the list of documents) with documents with higher scores at the top. This list is then sent to the ranking module 204 which will apply a ranking algorithm, such as the one described in the article entitled "The Anatomy of a Large-Scale Hypertextual Web Search Engine" by Sergey Brin and Lawrence Page of the Computer Science Department, Stanford University, Stanford Calif. 94305 (which article is hereby incorporated by reference) to rank the list of documents using the text factors and other rank factors, such as link analysis LA, popularity, the user's preferences Up from profile, etc. and return a reordered list of documents, with documents with higher scores at the top by providing each of the articles with a Rank Factors Score which is a number that varies from "0" to "1" that $$\text{Rank Factor Score} = F(w\% \; Tf + \% \times \text{Popularity} + y\% \; LA + z\%Up + \ldots) \quad (1)$$

where

F is the algorithmic function; and w, x, y+z are proportions applied to the various ranking factors by the algorithmic function F.

Ranking algorithms may differ from one another and the Rank Factors Score generated from any given algorithm may not take into account all the rank factors listed above and may take into account other rank factors.

Figure 3:
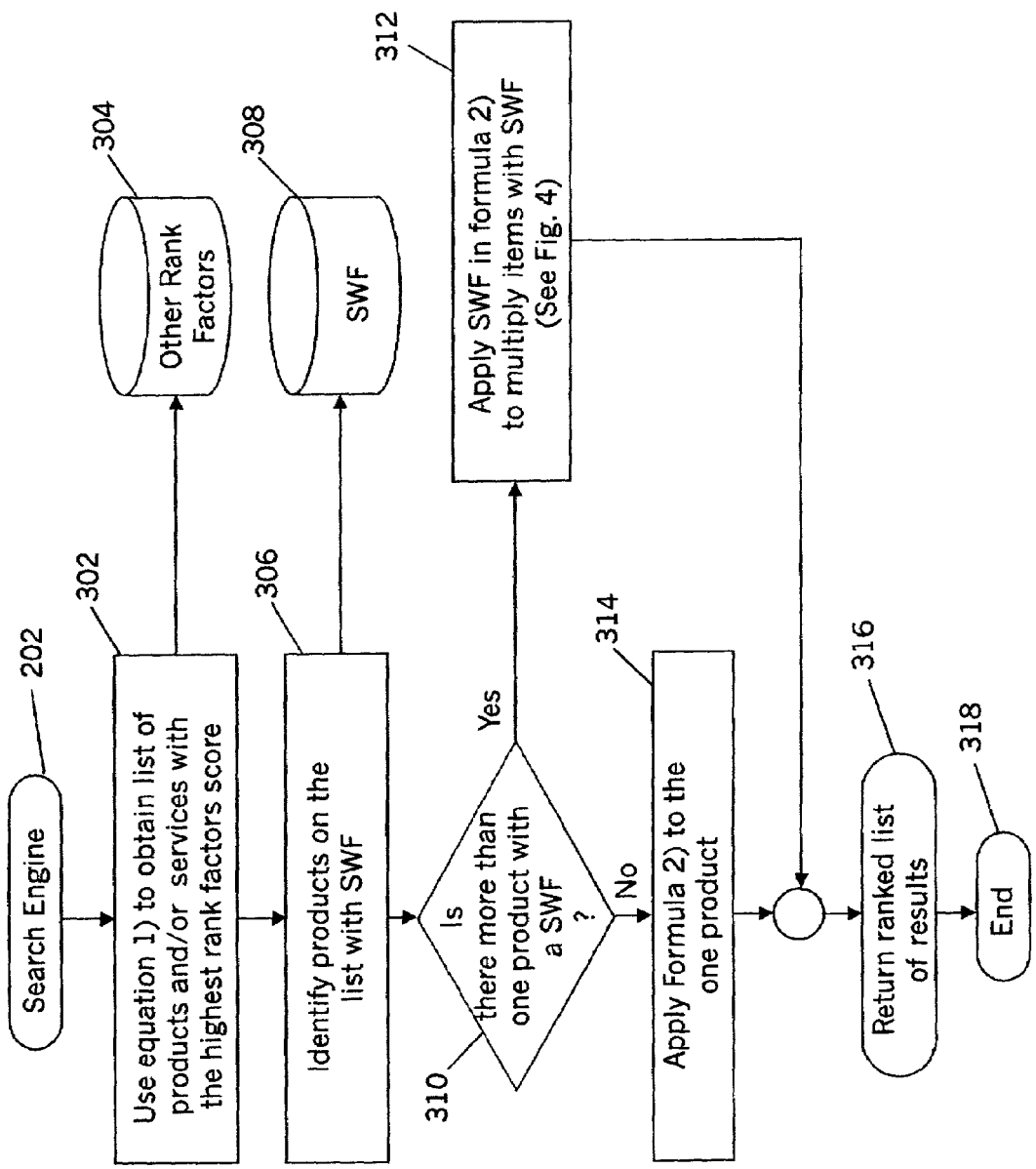
FIG. 3 is a more detailed flow chart for the ranking module for the present invention.

In accordance with the present invention a strategic weighting factor (SWF) is used to promote one or more products of the merchant in accordance with the wishes of the product merchant. For application of the weighting factor, an analysis must be done of terms found in documents that belong to common categories. To accomplish this, a document identifying the product must contain a number of words that commonly define the product. Such words are synonyms of the product and other words related to the products. For instance, the IBM Think Pad 550 product document would have words like laptop, thinkpad, notebook, companion computer, etc. Once identifying the product to be promoted and its document using the terms, the product document is given a weighting factor which varies from zero to one and it's stored in SWF database 308 as shown in FIG. 3. The ranking is then applied to the of the content in accordance with the following formula.

$$R = 1 - n(\text{Rank Factors Score}) + n(SWF \; \text{Factor}) \quad (2)$$

where:

n=a number between zero and one inclusive. (A recommended value of n is 0.5 when both the Rank Factors Score and the SWF Factor vary from 1 to 0.)

SWF=is the weighting factor for the merchants marketing strategy.

As pointed out above, the first bracketed portion (Rank Factors Score) is a function F of the applied ranking factors such as the text factors Tf) including the number of occurrences of key words in documents, proximity of key words in documents, location of keywords in documents), and other ranking factors such as the documents' popularity including the number of times a given document has be accessed by shoppers, number of incoming links to this documents, etc. The second bracketed category (SWF factor) is the weighting factor provided by the merchant to emphasize products he is interested in selling or products which he thinks the shopper may be interested in and not accounted for by the other weighting factors relating to the shopper's preferences. It can be seen that the above formula not only takes into account the merchant's marketing desires but provides them as a portion of the weighting factors in the ranking so that the merchant's desires do not necessarily outweigh other considerations and may vary to critical importance to insignificance in the ranking consideration.

Care must be taken not to overload the ranking by the SWF factor so that the shopper becomes confused by the presentation he receives relationship to his key word attributes. For instance, the value of 0.5 is selected for n when both the Rank Factors Score and the SWF range between 0 and 1. Another value for n may be more appropriate to maintain on appropriate relationship between the bracketed terms when other values are applied either by the algorithm or the merchant. Another factor to be avoided is the elimination of worthy candidates from the list by a lesser candidate having a high SWF Factor. This is illuminated by choosing the highest ranked products using the text ranking factors first then applying the SWF Factor after the application of the algorithmetic function so that the SWF Factor does not eliminate any of the worthy candidates but only changes the relative ranking of such worthy candidates.

Figure 4:
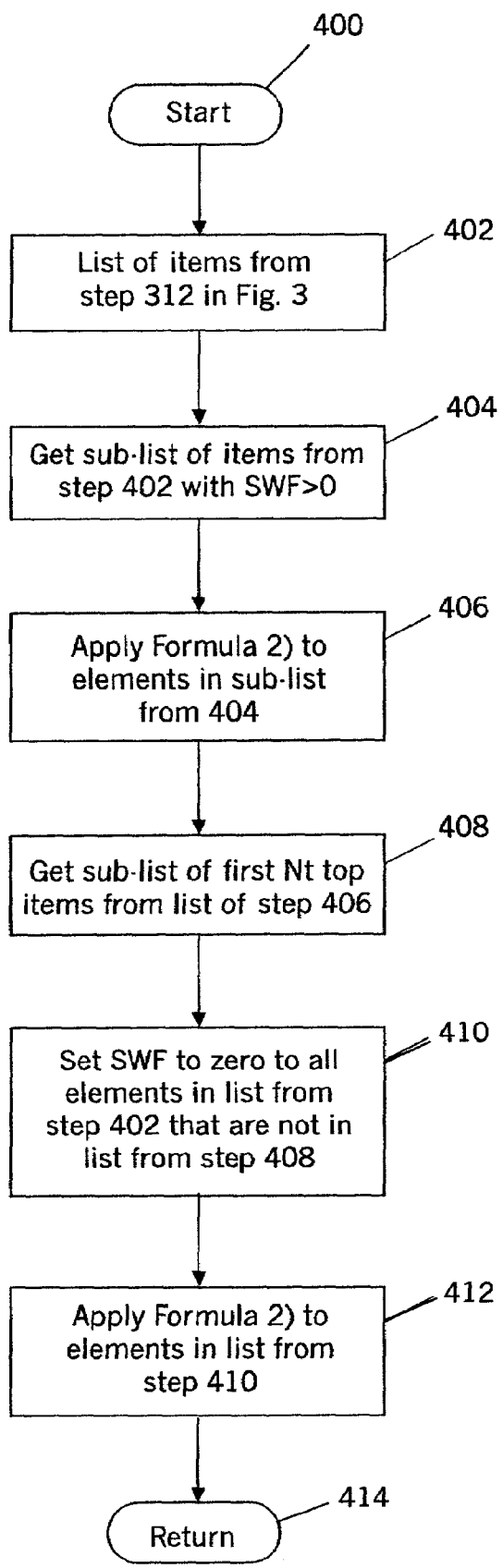
FIG. 4 a flow chart with the logic to apply.
Figure 5:
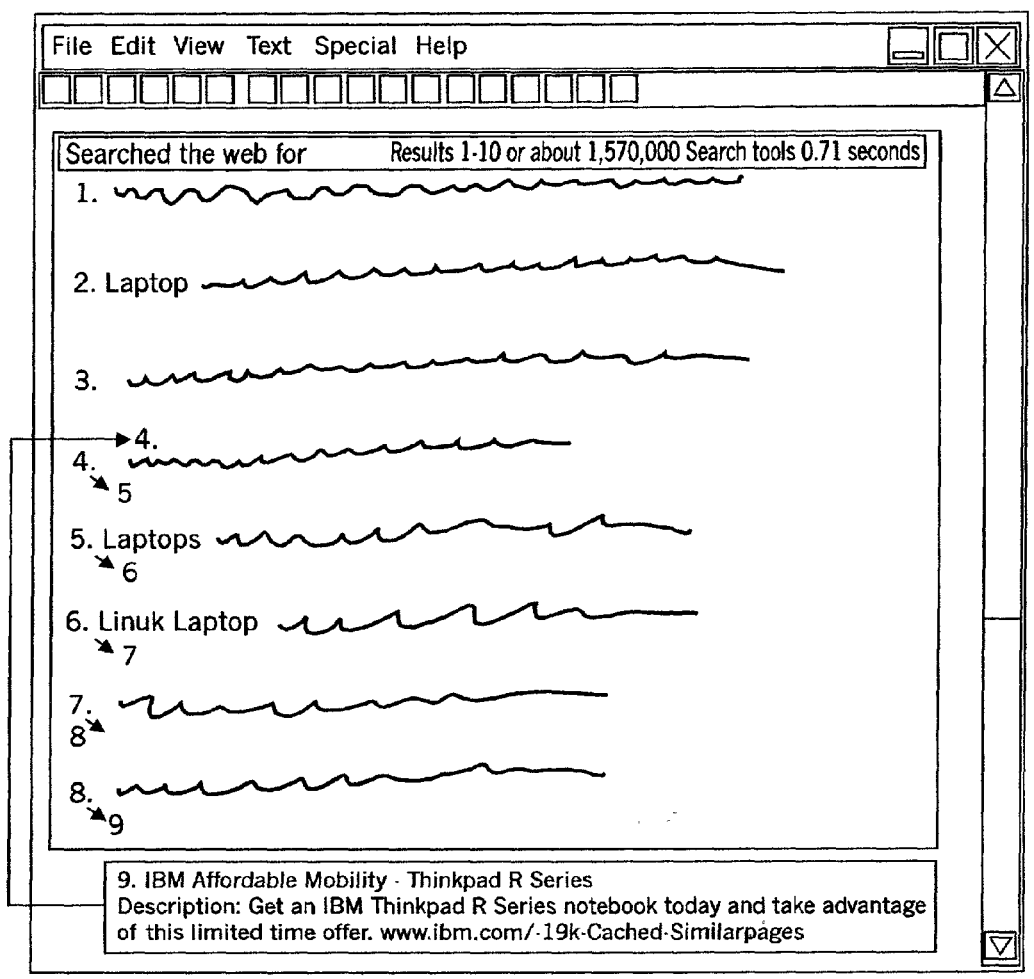
FIG. 5 is a diagram of data on rank provided to a shopper's computer screen.

FIG. 3 shows how the SWF factor is added to the search results to obtain the ultimate ranking of the products turned up by the search in the full text database 110. The search engine 202 provides the hits obtained from the document search in the appropriate fill text indexes 110 and/or 118 using the search terms provided by the shopper. The ranking factors 204, other than the SWF weighting factor, are applied to the count in step 302 to get a list of products and/or services (say ten) with the highest Rank Factor Score. The products and/or services on the list obtained by step 302 are then analyzed in step 306 to determine if any of them have a SWF weighting factor 308 applied to them. If there is only one product with a SWF, then Formula (21) is applied to that particular product 314 in the list and its rank is changed relative to the other products on the list in accordance with the results obtained with Formula (1). For instance as shown in FIG. 5, assume an article about a product with a SWF, such as a Thinkpad R Series Laptop, was ninth on the initial list and after application of its SWF in Formula (2) its R is the fourth highest, its rank would change from 9th to 4th as shown and the products ranked 4th to 8th would be changed accordingly. results taking into consideration multiple items with SWF greater than zero in step 312 in accordance with the process shown in FIG. 4. In step 402 of FIG. 4, a list of items is received from step 312 in FIG. 3. Then in step 404 a new list is created from output of step 402 containing all items with SWF greater than zero. Output of 404 is then applied Formula (1) to each on the list generated in step 406. Then a new sub-list of a limited number, Nt, of the items with the top Ranking R from the output of step 404 is selected in step 408, this will ensure than only a Nt (predefined value greater than zero) number of items with SWF are taken into consideration. The SWF of all items from output list of step 502 that are not of the sublist generated in step 408 are set to zero and Formula (2) is applied to the items on the items selected by Formula (1) to reorder the rank of the items.

Above we have described one embodiment of the invention. Modification of this described embodiment of the invention may be made by those skilled in the art. Therefore the invention is not limited to the described embodiment but includes all variations within the spirit and scope of the claims.

The invention claimed is:

1. A method for enabling an on-line merchant to tailor a response to a shopper's on-line interrogation, said software comprising:

ranking products of the on-line merchant using a Rank Factor Score (RFS) at least partially based on a count of hits to product descriptions in the merchants database by an on-line request of the shopper specifying characteristics of a product desired by the shopper including using other weighting factors in the ranking for taking into account other adjustments to tailor a presentation, the other ranking factors including factors for a customer's buying preferences and product popularity;

modifying the ranking of at least one of the merchants products ranked by the ranking factors, which modification is by a weighting factor based on a marketing strategy of the merchant so that the ranking is in accordance with the following formula:

$R=1-n(RFS)+n$ (SWF)

where:

RFS is a Rank Score Factor n is a number less than 1 representing a proportion of the adjustment applied to the SWF weighting factor SWF=is the Strategic Weighting Factor for the merchants marketing strategy R=Rank; and transmission software for providing to the shopper the presentation of products that presents the products in order of rank determined by both the initial ranking and the modification of at least one of the merchants products.

2. The method of claim 1 including modifying the ranking of a group of the merchants products based on the merchants marketing strategy.

3. The method of claim 2 including limiting a highest ranked of the group for insertion into the presentation prior to application of the SWF Factor.

4. The method of claim 3 including transmitting the presentation on the Internet intermixed with products of other merchants where the products of all merchants is presented to the shopper in order of rank.

5. A computer software product on a computer usable medium for enabling an on-line merchant to tailor a response to a shopper's on-line interrogations, said software comprising:

ranking computer code for ranking products of the on-line merchant based on a count of hits in product descriptions to on-line requests specifying characteristics of products described by the shopper;

weighting computer code for modification of the ranking of at least one of the merchants products by the ranking computer code, which modification is based on a marketing strategy of the merchant so that the ranking of the at least one product is in accordance with the following formula:

$R=1-n[F(\% wTf+x \% \text{Popularity}+y \%LA)]+n$ (SWF Factor)

where:

n is a number less than 1 representing a proportion applied to the SWF factor

SWF=is the Strategic Weighting Factor for the merchants marketing strategy w, x and y=proportions applied to the weighting factors Tf, Popularity, and SP Popularity=products popularity conforming to a raw weighting factor SP=is shopper buying practice Tf=Text Factors F is a function of popularity, SP, Tf and w, x, and y R=Rank; and transmission software for providing to the shopper a presentation of merchants products that presents a plurality of the merchants products in order of rank, where the rank of at least one of the products is determined by both the ranking and weighting computer code.

6. The computer program product of claim 5 including other weighting computer codes for taking into account other ranking factors.

7. The computer program code of claim 6, wherein the other ranking factors include a customer's buying characteristics and a product's popularity.

8. An internet server containing software on a computer usable medium for enabling an on-line merchant to tailor a response to a shopper's on-line interrogations, said software comprising:

searching computer code responsive to an on-line request entered by the shopper;

ranking computer code for ranking products of the on-line merchant based on a count of hits in product descriptions to an on-line request of the shopper specifying characteristics of products described by the shopper;

weighting computer code for modification of the ranking of the rank of at least one of the merchants products by the ranking computer code, which modification is based on a marketing strategy of the merchant so that the ranking of the at least one product is in accordance with the following formula:

$$R = 1 - n\ [F(w\ \%\ Tf + x\ \%\ Popularity + y\ \%SP)] + n(SWF)$$

where:

n is a number less than 1 representing a proportion applied to the SWF factor

SWF=is the Strategic Weighting Factor for the merchants marketing strategy w, x, and y=proportions applied to the weighting factors Tf, Popularity, and SP Popularity=products popularity conforming to a raw weighting factor SP=is shopper buying practice Tf=Text Factors F is a function of popularity, SP, Tf, and w, x, and y R=Rank; and transmission software for providing to the shopper a presentation of merchants products that presents a plurality of the merchants products in order of rank, where the rank of at least one of the products is determined by both the ranking and weighting computer code.

* * * * *